Oct. 20, 1953 — T. PASTA — 2,655,799
SUGAR BOWL
Filed Oct. 18, 1948
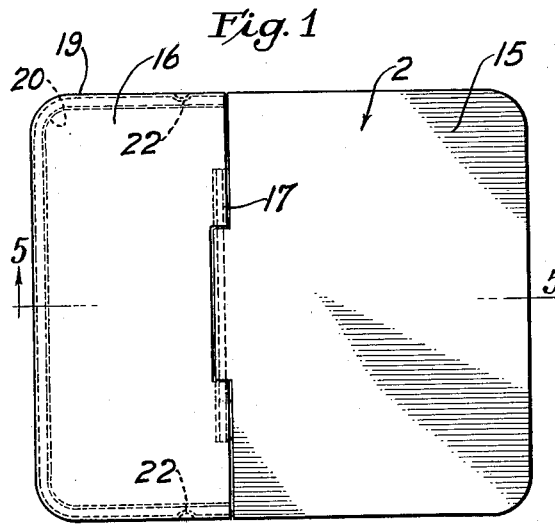
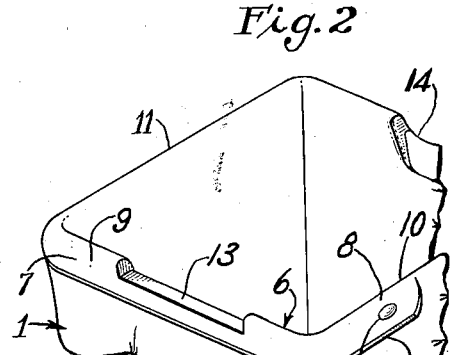
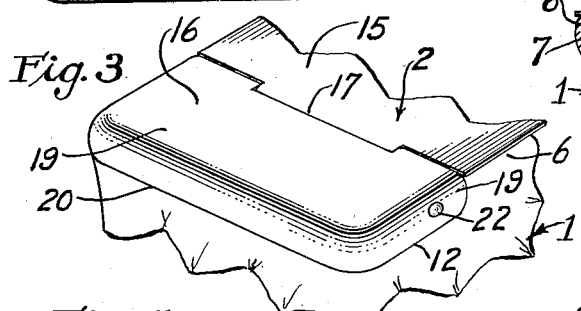
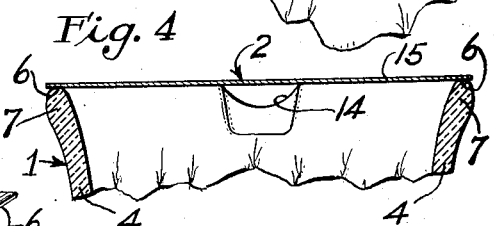
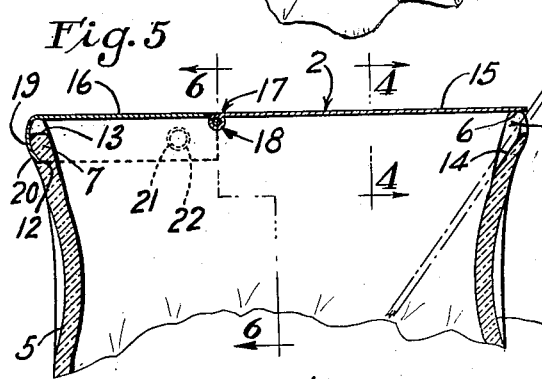
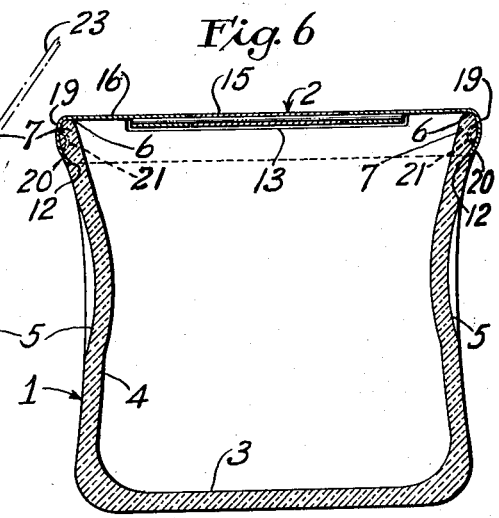
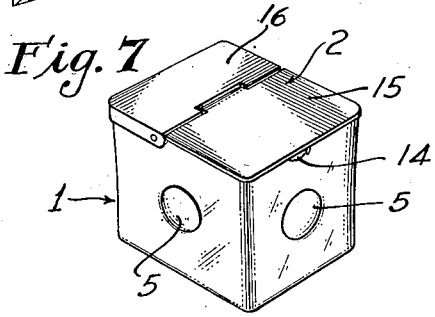
Inventor,
TITO PASTA
By Calvin Brown
Attorney Patented Oct. 20, 1953

2,655,799

UNITED STATES PATENT OFFICE 2,655,799

SUGAR BOWL

Tito Pasta, Los Angeles, Calif.

Application October 18, 1948, Serial No. 55,055

2 Claims. (Cl. 65—60)

1

The present invention relates to bowls of a type which may be used for the holding of various commodities such as flour or sugar, which bowl will hold the food article and maintain the same in sanitary condition.

With specific reference to use of the bowl for the holding of granulated sugar for use in restaurants, cafes, or other places where the public has access to the sugar, the present bowl provides a means whereby the sugar is maintained in a clean condition and without contamination.

The present bowl structure contemplates a cover having a part for detachable engagement with the bowl and a swing part which may be lifted for access to the interior of the bowl. It is intended that the swing part should normally overlie the bowl so as to maintain the food content of the bowl in sanitary condition. Health ordinances generally require that any contamination of a food product for use by the public in a restaurant renders the food product unfit for use by others. As a consequence, contamination by cigarette ashes and the like, which is of frequent occurrence in restaurants, causes waste of the food product with resultant expense to the proprietor.

The invention is sightly in appearance, can readily be shipped to the ultimate user by stacking of the devices, is inexpensive in cost of manufacture, and generally superior to devices of like character presently known to the inventor.

With the above-mentioned and other objects in view, the invention consists in the novel and useful provision, formation, construction, association, and relative arrangement of parts, members and features, all as depicted in one embodiment in the accompanying drawing, described generally and more particularly pointed out in the claims.

Figure 1 is a plan view of the bowl and its cover,

Figure 2 is a fragmentary perspective view of the bowl,

Figure 3 is a fragmentary perspective view of the bowl and cover,

Figure 4 is a fragmentary sectional view on the line 4—4 of Figure 5,

Figure 5 is a fragmentary sectional view on the line 5—5 of Figure 1,

Figure 6 is a sectional view on the line 6—6 of Figure 5, and

Figure 7 is a perspective view of the invention.

Referring now with particularity to the drawing, the bowl is designated as an entirety by 1, and a cover therefor by 2. The bowl 1 may be formed of any material such as metal, glass or a ceramic. In the figures, I have shown the bowl as formed of glass, and said bowl includes a base 3, having a flat surface, and the usual enclosing side walls designated generally as 4.

In the present instance, the bowl is rectangular in form, although it may assume any other form desired. The side walls are bowed or curved inwardly as shown best in Figures 5 and 6, with each side wall provided with a central concave depression 5, functioning as a finger hold for the bowl. The upper edge 6 of the bowl is provided with an external embossment 7 to enhance the appearance of the bowl and likewise perform an important function in cooperation with the cover. This embossment is reduced in transverse dimension for a portion thereof as shown in Figure 2 at 8. Such reduction extends along the upper edge 6 of one side of the bowl, and from said side for a portion of the length of two adjacent opposed sides 10 and 11 of the bowl, to form a bead 9 along the upper edge 6 of said side and said portions of said two sides 10 and 11. Such reduction in transverse thickness or dimension of said embossment 7, forming said bead 9 provides a ledge or shoulder 12 along the lower side of said bead. The bead 9 is shown cut away at 13 in said first described side. The unreduced portion of embossment 7 has a depressed portion at 14.

The cover 2 has two portions, 15 and 16, hinged together at 17 in such a manner that the knuckles appear on what is termed the "underside" of the cover, shown at 18 in Figure 5. This leaves the top surface of both portions substantially flush or unobstructed. The portion 16 is provided with a marginal flange 19 and which flange has an inturned portion or lip 20. The part 15 of the cover is planar, which is to say, it constitutes a single piece which rests normally upon the marginal edge of the bowl as shown in the figures.

Part 16 is adapted to engage the reduced width portion of the embossment so as to hold the cover detachably to the bowl. The gauge of the metal of flange 19 is the same as the width of the shoulder or ledge 12, with the result that when cover portion 16 is moved over the rim bead 9, the thickness of the flange 19 will be equal to the width of the shoulder or ledge 12, with the result that the external surface of the remaining portion of the bead and the external surface of the flange will be in flush relationship, as shown best in Figure 3.

In order to assure that the portion 16 will remain in position upon the bowl, I provide indentations 21 in the bead which cooperate with indented portions 22 in the side flanges of the cover portion 16. The cutaway portion 13 is of such length as to allow the hinge 17 to readily pass therethrough. Thus, when the cover considered as an entirety completely overlies the rim of the bowl, the front edge of said movable portion of the cover will overlie concavity 14.

As indicated in Figure 5, a spoon handle 23 may pass within the bowl through said concavity.

The operation, uses and advantages of the invention just described are as follows:

Assuming that the bowl is to be used for the dispensing of sugar, after the bowl is sterilized and sugar placed therein, the cover may be placed thereover by sliding the part 16 upon the embossment portion of reduced thickness, the lip 20 associated with the flange 19 being received in the undercut portion of the embossment in the zone of the shoulder or ledge 12 so as to hold this portion of the cover in substantially tight engagement with said embossment.

The indented portions of both the embossment and the flange will cooperate to interlock and prevent easy removal of the cover from the bowl. The part 15 of the cover will then overlie the margin of the bowl and the device is ready for use.

When it is desired to have access to the bowl content, the cover 15 may be raised, and by forming the cover of metal, it will have sufficient weight to drop over the margin of the bowl when the cover is released. In other words, the cover will not remain elevated unless manually held in that position.

The concave portions 5 permit a user of the bowl to readily grasp the same and to lift the bowl without any fear of slippage.

The bowl's configuration allows the bowls to be stacked one on the other for sterilization purposes or for shipment, and the covers may be nested together.

By forming the bowl of crystal or cut glass, and providing a cover having a soft silver finish or even a chromium plate, the ornamental appearance of the bowl is enhanced and made attractive.

It is evident that I may vary the size of the two portions of the cover by either enlarging the fixed portion 16 and reducing the width of the movable portion 15 or vice versa, depending upon use of the invention.

I claim:

1. In a device of the character disclosed, a bowl, the upper end of one side and portions of the upper ends of two adjoining sides extending from said upper end of said first side being formed with an external embossment, the upper edge of a fourth side and portions of the upper edges of said two sides, extending from said upper edge of said fourth side to the ends, respectively, of said external embossment of said upper edges of said two sides, the upper edge of said fourth side and the upper edges of said portions of said two sides extending from the upper edges of said fourth side being undercut downwardly to form an external bead and an external shoulder at the lower side of said bead, a two part cover, which parts are hinged together over the top of the bowl, one part of said cover being formed with a depending inturned marginal flange along three side edges thereof, for slidably engaging said bead along the upper edges of said fourth side and the upper edges of said portions of said two sides extending from the upper edges of said fourth side of the bowl for holding said cover part on said bead against upward displacement from said bead over a part of the top of said bowl, the width of said shoulder and the thickness of said flange being substantially the same to provide a flush-fit engagement between the adjoining ends of said flange and the ends of said embossed upper edges of said two sides of said bowl, respectively, the other hinged part of said cover being arranged to swing up to uncover the remaining part of the top of the bowl, and to swing down upon the embossed upper edge portion of the bowl to cover said remaining part of the top of the bowl.

2. In a device of the character as disclosed, a bowl, the upper edge of one side and portions of the upper edges of two adjoining sides of the bowl extending from said upper edge of said side being undercut to form an external bead, a two-part cover having its parts hinged together with its hinge knuckles located on the under side of said cover, one part of said cover being formed with a depending inturned flange on three outer edges thereof to fit over the three sides of said bead, and the other part of said cover being planar and adapted to swing down and overlie the upper edges of another side and the portions of said two sides of the bowl, and a portion of the upper edge of said first side being cut away, through which cut-away portion said depending hinge knuckles may pass to permit said depending flange to slide on or off said bead on the upper edge of said bowl.

TITO PASTA.

References Cited in the file of this patent
UNITED STATES PATENTS

| Number | Name | Date |
|---|---|---|
| Re. 8,595 | Knecht | Feb. 25, 1879 |
| 89,996 | Hobbs | May 11, 1869 |
| 128,100 | Bennett | June 18, 1872 |
| 194,518 | Hall | Aug. 28, 1877 |
| 230,724 | Trump | Aug. 3, 1880 |
| 284,239 | Russell | Sept. 4, 1883 |
| 497,940 | Bacon, Jr. | May 23, 1893 |
| 903,026 | Tombleson | Nov. 3, 1908 |
| 952,409 | Becker | Mar. 15, 1910 |
| 980,066 | Collins | Dec. 27, 1910 |
| 1,149,445 | Holmes | Aug. 10, 1915 |
| 1,197,389 | Newton | Sept. 5, 1916 |
| 1,246,390 | Cable | Nov. 13, 1917 |
| 1,347,419 | Swenson | July 20, 1920 |
| 1,482,724 | Baron | Feb. 5, 1924 |
| 1,543,800 | Shewry | June 30, 1925 |
| 1,581,691 | Ratner | Apr. 20, 1926 |
| 1,583,512 | Worth | May 4, 1926 |
| 1,638,250 | Finlayson | Aug. 9, 1927 |
| 1,953,765 | McCluney | Apr. 3, 1934 |
| 2,016,980 | Baron | Oct. 8, 1935 |
| 2,047,582 | Hale | July 14, 1936 |

FOREIGN PATENTS

| Number | Country | Date |
|---|---|---|
| 354,855 | Great Britain | Aug. 20, 1931 |
| 506,086 | France | May 21, 1920 |
| 614,277 | Germany | June 5, 1935 |